US012566241B2

(12) United States Patent
Lou et al.

(10) Patent No.: US 12,566,241 B2
(45) Date of Patent: Mar. 3, 2026

(54) MILLIMETER WAVE COMMUNICATION AND RADAR SENSING DEVICE AND METHOD OF THE SAME

(71) Applicant: QuantumZ Inc., Kaohsiung (TW)

(72) Inventors: Chih Yang Lou, Kaohsiung (TW); Meng-Hua Tsai, Kaohsiung (TW); Wei Ting Lee, Kaohsiung (TW); Sin-Siang Wang, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 279 days.

(21) Appl. No.: 18/584,995

(22) Filed: Feb. 22, 2024

(65) Prior Publication Data

US 2024/0329195 A1     Oct. 3, 2024

(30) Foreign Application Priority Data

Mar. 31, 2023    (TW) ................................. 112112520

(51) Int. Cl.
*G01S 7/03* (2006.01)
*G01S 13/02* (2006.01)

(52) U.S. Cl.
CPC .............. *G01S 7/032* (2013.01); *G01S 13/02* (2013.01); *G01S 2013/0245* (2013.01)

(58) Field of Classification Search
USPC ............................................. 342/57, 58, 60
See application file for complete search history.

(56) References Cited

U.S. PATENT DOCUMENTS

| | | | | | |
|---|---|---|---|---|---|
| 5,955,984 | A | * | 9/1999 | Schober .................. | G01S 13/86 |
| | | | | | 342/159 |
| 7,423,577 | B1 | * | 9/2008 | McIntire ................. | G01S 7/006 |
| | | | | | 375/295 |
| 7,515,091 | B2 | * | 4/2009 | Meyers ................... | G01S 7/003 |
| | | | | | 342/60 |
| 7,978,123 | B2 | * | 7/2011 | Lam ........................ | G01S 7/006 |
| | | | | | 342/134 |
| 2011/0148688 | A1 | * | 6/2011 | Sutphin ................... | G01S 7/006 |
| | | | | | 342/28 |
| 2012/0092205 | A1 | * | 4/2012 | Bourdelais .............. | G01S 7/006 |
| | | | | | 342/21 |
| 2016/0178730 | A1 | * | 6/2016 | Trotta ..................... | G01S 13/87 |
| | | | | | 342/175 |
| 2018/0199377 | A1 | * | 7/2018 | Sanderovich ........... | G01S 7/023 |
| 2020/0174095 | A1 | * | 6/2020 | Altintas ................ | G01S 13/345 |

(Continued)

*Primary Examiner* — Bernarr E Gregory
(74) *Attorney, Agent, or Firm* — CKC & Partners Co., LLC

(57) ABSTRACT

An electric device and a method for utilizing millimeter wave communication and radar sensing are provided. The electric device includes an antenna module, a millimeter wave communication module, a radar sensing module and a control module. The millimeter wave communication module and the radar sensing module share a sine-wave generator circuit, a frequency upconverter and a frequency downconverter, and respectively perform a millimeter wave communication operation and a radar sensing operation in accordance with an operation indicator signal transmitted by the control module. The method includes: using an operation indicator signal transmitted by a control module to control a millimeter wave communication module and a radar sensing module to perform a millimeter wave communication operation and a radar sensing operation in a predetermined work period.

10 Claims, 11 Drawing Sheets

(56) References Cited

U.S. PATENT DOCUMENTS

| | | | | |
|---|---|---|---|---|
| 2020/0319327 A1* | 10/2020 | Tsvelykh | ............. | G01S 13/933 |
| 2020/0376962 A1* | 12/2020 | Ito | ........................ | B60W 50/14 |
| 2023/0099378 A1* | 3/2023 | Fabrega Sanchez | .. | H01Q 21/08 |
| | | | | 342/22 |
| 2023/0314554 A1* | 10/2023 | Kalantari | ............... | G01S 7/003 |
| | | | | 342/59 |

* cited by examiner

FIG. 2

MILLIMETER WAVE COMMUNICATION AND RADAR SENSING DEVICE AND METHOD OF THE SAME

RELATED APPLICATIONS

This application claims priority to Taiwan Application Serial Number 112112520, filed Mar. 31, 2023, which is herein incorporated by reference.

BACKGROUND

Field of the Invention

The present invention relates to an electric device and a method for utilizing millimeter wave communication and radar sensing.

Description of Related Art

The current millimeter wave radars perform sensing operation by using frequency modulated continuous wave (FMCW) technology. The FMCW technology continuously provides a plurality of sine-wave signals with linearly incremental frequencies, and utilizes these sine-wave signals to perform radar sensing. The distance and speed of a target are calculated in accordance with reflected waves received by the radars. In addition, the current millimeter wave radars can also calculate the angles of targets in a multi-antenna receiving mode. As a result, the current millimeter wave radars are capable of performing complex calculations applicable to various fields such as autonomous driving, motion recognition, and physiological detection.

SUMMARY

The present invention provides an electric device and a method for utilizing millimeter wave communication and radar sensing. The electric device integrates a millimeter wave communication function with a millimeter wave radar sensing function, so that the electric device can perform millimeter wave communication and millimeter wave radar sensing in different time slots. In some embodiments of the present invention, radar resident operations (e.g., automatic driving) and non-resident applications (e.g., gesture recognition) can be provided simultaneously. Antennas in a radar can be utilized in a communication mode to improve the quality and/or speed of communication in some embodiments.

BRIEF DESCRIPTION OF THE DRAWINGS

FIG. 2 is a schematic diagram showing a waveform of an operation indicator signal in accordance with embodiments of the present invention.

DETAILED DESCRIPTION

Embodiments of the present invention are described below. However, it is understood that the embodiments provide many applicable concepts that can be implemented in a wide variety of specific contents. The embodiments discussed and disclosed are for illustrative purposes only and are not intended to limit the scope of the present invention.

As used herein, the terms "first", "second" and the like do not specifically refer to the meaning of order or sequence, but only are used to distinguish components or operations described in same technical terms.

Figure 1:
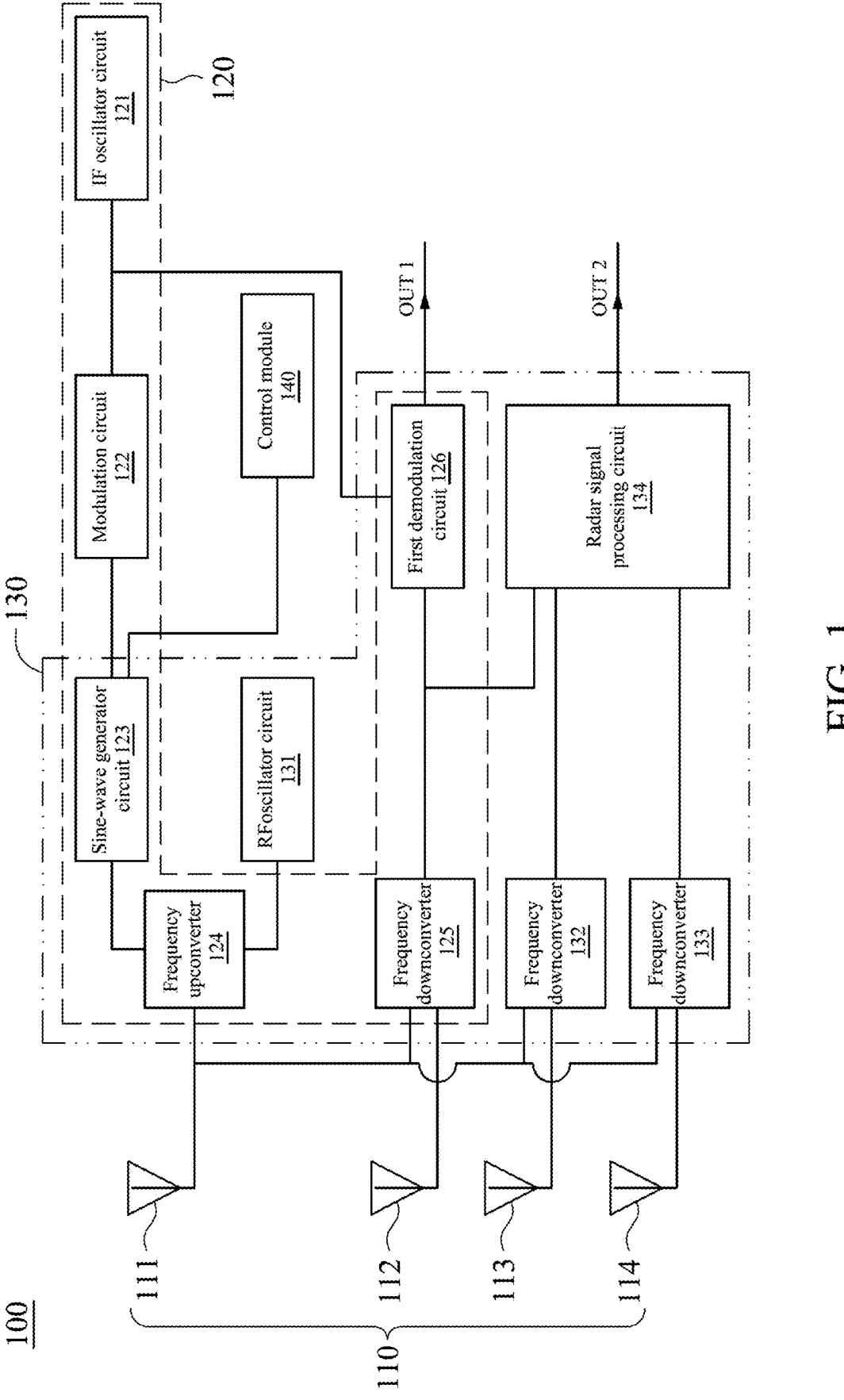
FIG. 1 is a functional block diagram showing a millimeter wave communication and radar sensing device in accordance with embodiments of the present invention.

Referring to FIG. 1, a functional block diagram shows an electric device 100 for utilizing millimeter wave communication and radar sensing in accordance with embodiments of the present invention. The electric device 100 includes at least one antenna module 110, a millimeter wave communication module 120, a radar sensing module 130 and a control module 140. The antenna module 110 includes a plurality of antenna devices. In this embodiment, the antenna module 110 includes four antenna devices, e.g., a first antenna device 111, a second antenna device 112, a third antenna device 113 and a fourth antenna device 114. However, the embodiments of the present invention are not limited to this. The millimeter wave communication module 120 is electrically connected to the antenna module 110 to perform millimeter wave communication by using the antenna module 110. The millimeter wave communication module 120 includes: an intermediate frequency (IF) oscillator circuit 121, a modulation circuit 122, a sine-wave generator circuit 123, a frequency upconverter 124, a frequency downconverter 125 and a first demodulation circuit 126. The first demodulation circuit 126 may output a millimeter wave data signal OUT1 to a back-end computer device (not shown), so that the back-end computer device processes the millimeter wave data signal OUT1.

The radar sensing module 130 is electrically connected to the antenna module 110 to perform radar sensing by using the antenna module 110. The radar sensing module 130 includes: a sine-wave generator circuit 123, a frequency upconverter 124, a frequency downconverter 125, a first demodulation circuit 126, a radio frequency (RF) oscillator circuit 131, a frequency downconverter 132, a frequency downconverter 133 and a radar signal processing circuit 134. The radar signal processing circuit 134 may output a radar data signal OUT2 to the back-end computer device, so that the back-end computer device processes the radar data signal OUT2.

As shown in FIG. 1, in some embodiments of the present invention, the millimeter wave communication module 120 and the radar sensing module 130 share the sine-wave generator circuit 123, the frequency upconverter 124, the frequency downconverter 125, and the first demodulation circuit 126. Such integrated design can significantly reduce the volume and cost of the electric devices 100, and efficiently provide millimeter wave communication and radar sensing functions. In addition, the control module 140 is electrically connected to the sine-wave generator circuit 123 shared by the millimeter wave communication module 120 and the radar sensing module 130 to transmit an operation indicator signal to the sine-wave generator circuit 123 so as to control the millimeter wave communication module 120 and the radar sensing module 130 to perform a millimeter wave communication operation and a radar sensing operation respectively.

Figure 2:
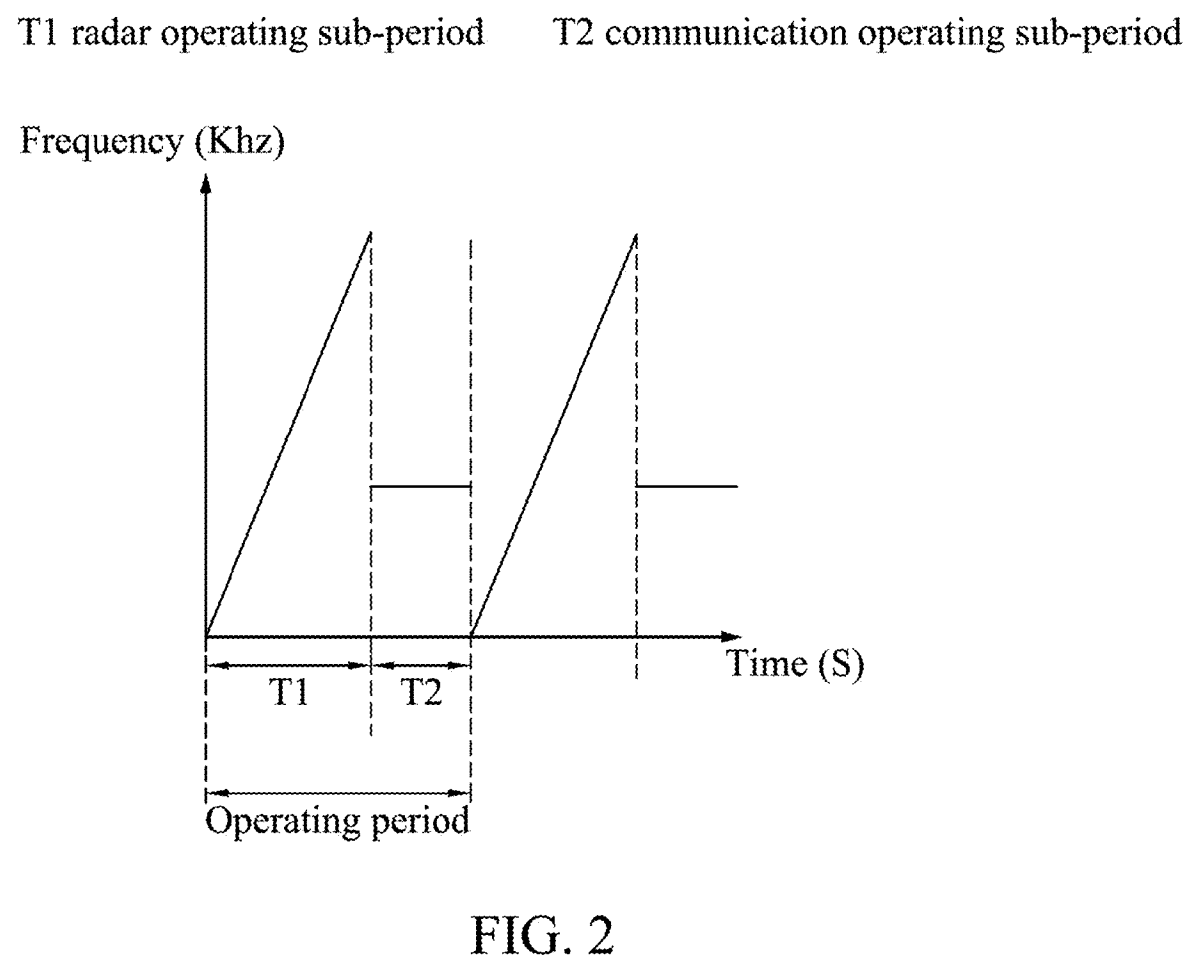

Referring to FIG. 2, a schematic diagram shows a waveform of an operation indicator signal in accordance with embodiments of the present invention. In one embodiment of the present invention, operating periods of the operation indicator signal includes a radar operating sub-period T1 and a communication operating sub-period T2. The radar operating sub-period T1 corresponds to the radar sensing operation performed by the radar sensing module 130, and the communication operating sub-period T2 corresponds to the millimeter wave communication operation performed by the millimeter wave communication module 120. For example, when the operation indicator signal is in the radar operating sub-period T1, the electric device 100 enters a state of the radar sensing operation and provides the radar sensing function. For another example, when the operation indicator signal is in the communication operating sub-period T2, the electric device 100 enters a state of the millimeter wave sensing communication and provides the millimeter wave sensing communication function.

Figure 3:
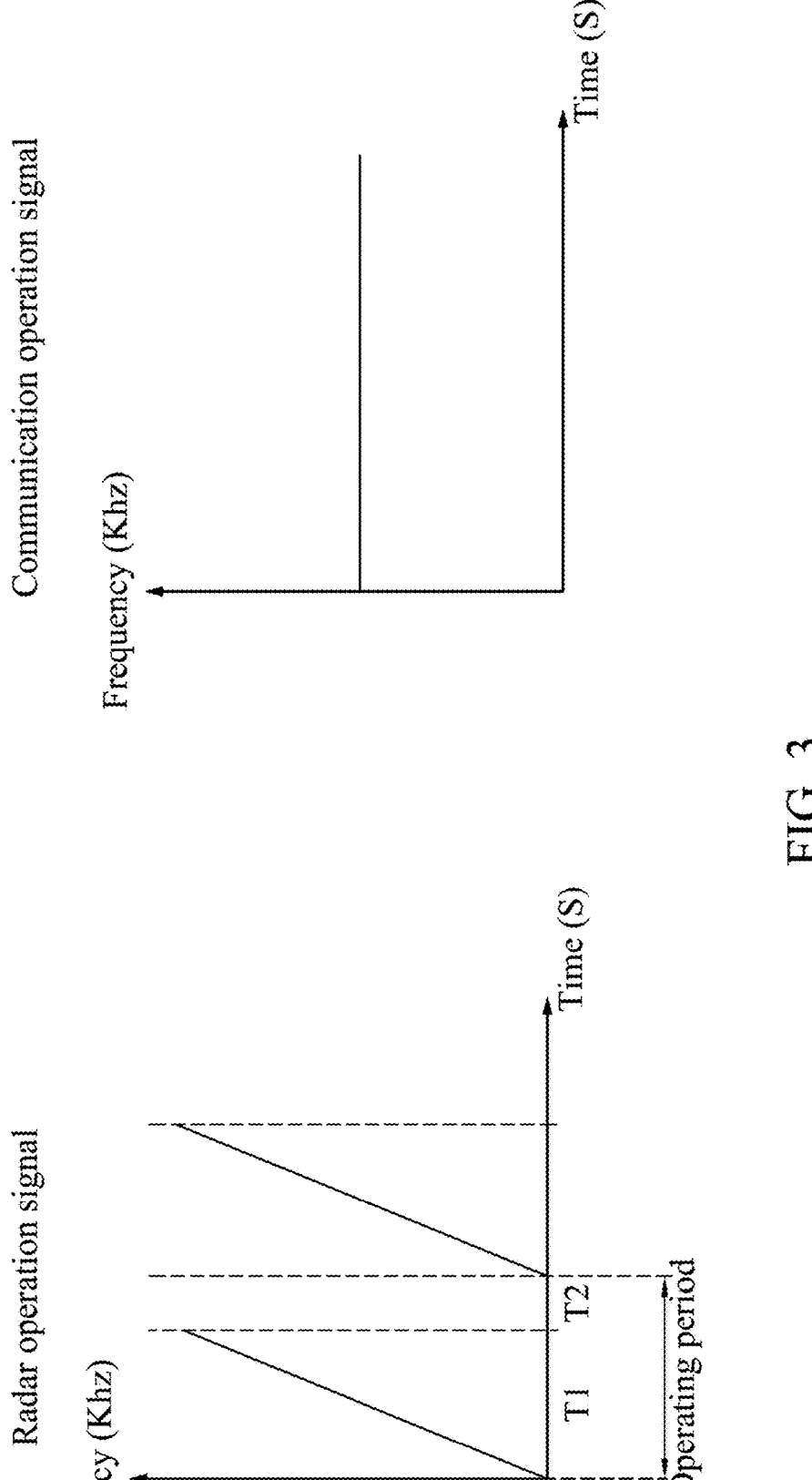
FIG. 3 is a schematic diagram showing a waveform of an operation indicator signal in accordance with embodiments of the present invention.

Referring to FIG. 3, a schematic diagram shows a waveform of an operation indicator signal in accordance with embodiments of the present invention. In some embodiments of the present invention, the control module 140 stores a radar operation signal and a communication operation signal, so that the control module 140 can select one of the radar operation signal or the communication operation signal in accordance with a user setting to output a sine-wave generator circuit 123, so as to switch the operation modes at any time to meet a user's needs. For example, when a user requires the electric device 100 to provide the radar sensing function, the user may set the control module 140 to output the radar operation signal, so that the electric device 100 enters the radar sensing operation status. For another example, when the user requires the electric device 100 to provide the millimeter wave communication function, the user may set the control module 140 to output the communication operation signal, so that the electric device 100 enters the millimeter wave communication status.

Figure 4:
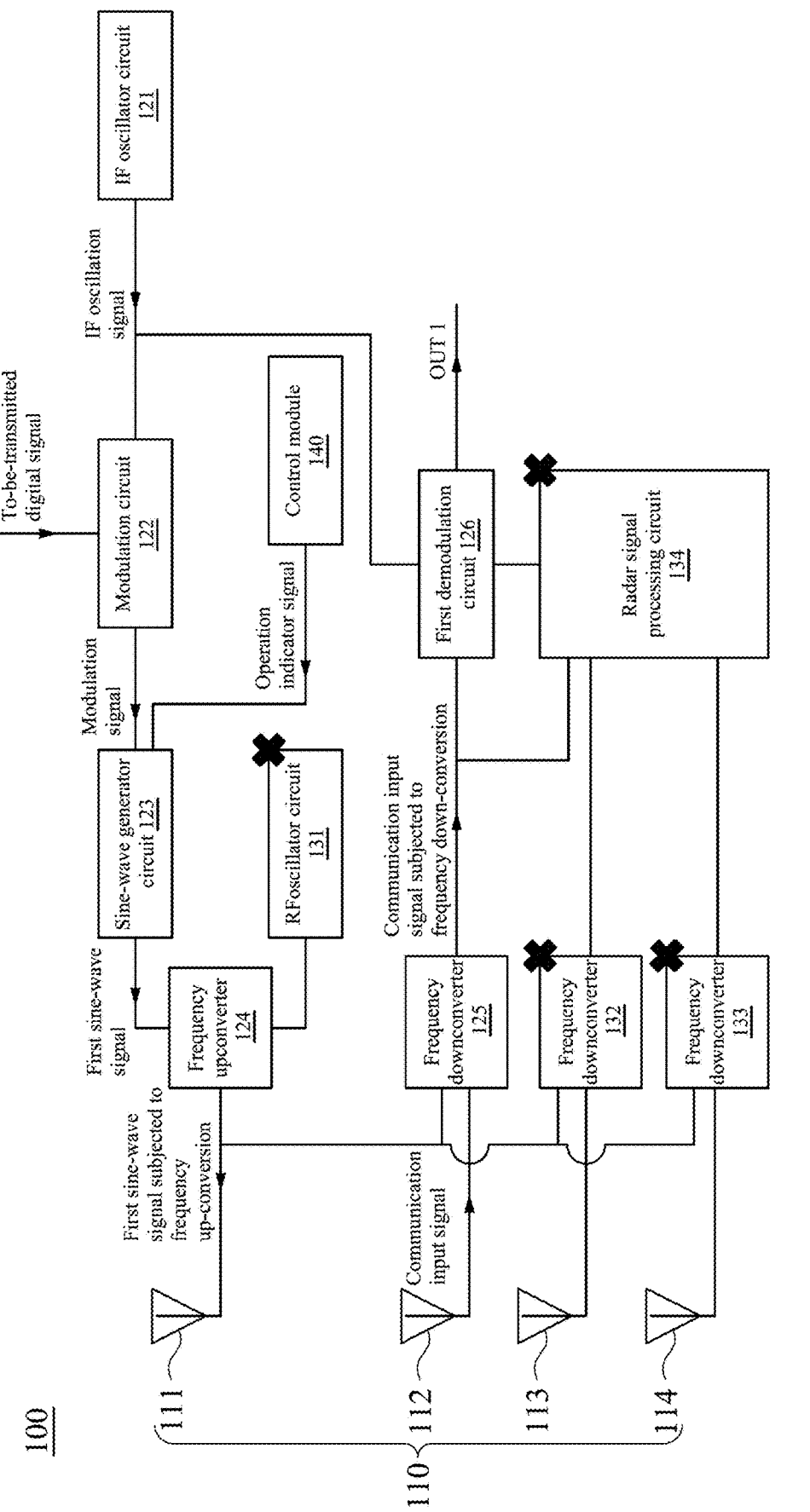
FIG. 4 is a schematic diagram showing performing a communication operation by the millimeter wave communication and radar sensing device in accordance with embodiments of the present invention.

Referring to FIG. 4, a schematic diagram shows performing a communication operation by the electric device 100 for millimeter wave communication and radar sensing in accordance with embodiments of the present invention. As shown in FIG. 4, in the millimeter wave communication operation, first, an intermediate frequency (IF) oscillator circuit 121 is used to provide an IF oscillation signal. Then, a modulation circuit 122 is used to perform a modulation operation on the IF oscillation signal and a to-be-transmitted digital signal to output a modulation signal. In this embodiment, the modulation circuit 122 is phase-shift keying (PSK) modulation circuit, but the embodiments of the present invention are not limited thereto. The sine-wave generator circuit 123 are then used to receive the modulation signal and the operation indicator signal output by the control module 140 to output a first sine-wave signal in accordance with the operation indicator signal and the modulation signal, wherein the operation indicator signal corresponding to the millimeter wave communication operation is a signal of a fixed value, as shown in FIGS. 2 and 3. In this embodiment, the sine-wave generator circuit 123 is a sine-wave generation circuit, but the embodiments of the present invention are not limited to this. Next, the frequency upconverter 124 performs frequency up-conversion on the first sine-wave signal, and outputs the first sine-wave signal frequency up-conversed to the antenna device in the antenna module 110, such as the first antenna device 111. In such a way, the first antenna device 111 can transmit the first sine-wave signal frequency up-conversed.

In some embodiments of the present invention, digital signals to be transmitted includes sound and/or image signals, but the embodiments of the present invention are not limited to this.

As described above, the IF oscillator circuit 121, the modulation circuit 122, the sine-wave generator circuit 123 and the frequency upconverter 124 are used to send digital signals to be transmitted to another electric device, such as a base station, so as to complete the wireless transmission of the signals through the base station.

Next, considering the wireless reception of signals, the frequency downconverter 125 receives a communication input signal through the antenna device in the antenna module 110. In this embodiment, the frequency downconverter 125 receives the communication input signal through the antenna device 112. However, the embodiments of the present invention are not limited to this. The communication input signal may be, for example, a wireless digital signal transmitted by the base station, and includes a sound signal and/or an image signal. The frequency downconverter 125 performs frequency down-conversion on the communication input signal and then transmits the communication input signal to the first demodulation circuit 126, so that the communication input signal is demodulated to obtain a millimeter wave data signal OUT1, such as the sound signal and/or image signal described above. In this embodiment, the first demodulation circuit 126 is a PSK demodulation circuit that performs demodulation on an IF oscillator signal received from an IF oscillator circuit 121, but the embodiments of the present invention are not limited to this.

In addition, as shown in FIG. 2, when the millimeter wave communication operation is performed, the RF oscillator circuit 131, the frequency downconverter 132, the frequency downconverter 133 and the radar signal processing circuit 134 are in a disabled state. In some embodiments, the back-end computer device can be controlled to not-receive/ ignore data output by the radar signal processing circuit 134, in such a way, the circuits above cannot be disabled.

Figure 5:
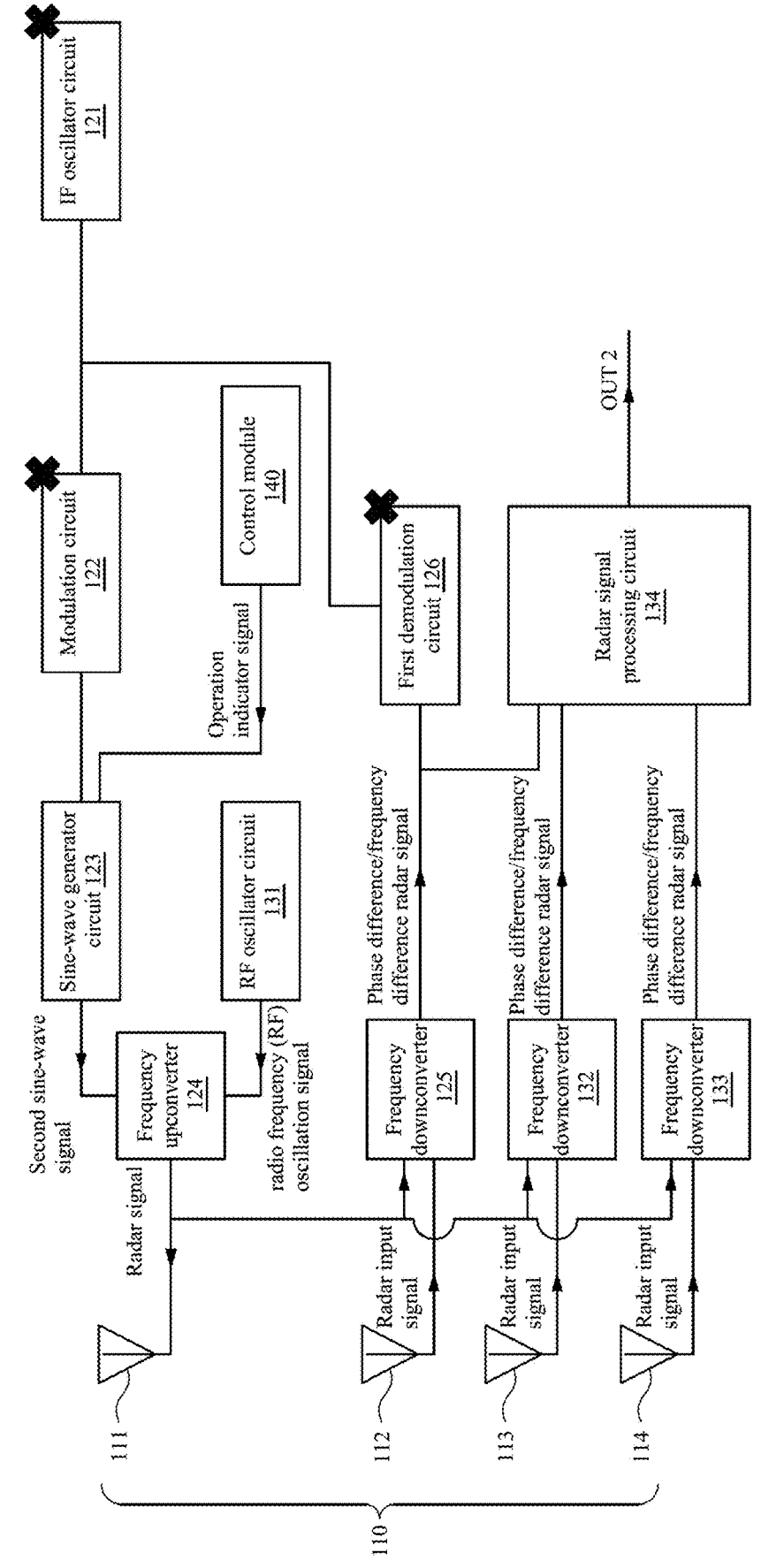
FIG. 5 is a schematic diagram showing performing a radar sensing operation by the millimeter wave communication and radar sensing device in accordance with embodiments of the present invention.

Referring to FIG. 5, a schematic diagram shows a radar sensing operation performed by the electric device 100 in accordance with embodiments of the present invention. In the radar sensing operation, first, the sine-wave generator circuit 123 is used to receive an operation indicator signal to output a second sine-wave signal in accordance with the operation indicator signal. In this embodiment, the radar sensing operation is implemented by performing by using the frequency modulated continuous wave (FMCW) technology. The operation indicator signal corresponding to the radar sensing operation is a linear frequency modulation pulse signal with incremental values, as shown in FIGS. 2 and 3. In addition, a RF oscillator circuit 131 is used to provide a RF oscillator signal required for the FMCW technology.

Next, the frequency upconverter 124 is used to receive the second sine-wave signal and the RF oscillation signal to output a radar signal to the antenna module 110. In this embodiment, since the frequency upconverter 124 has a mixer, the radar sensing operation in this embodiment is an operation of mixing the RF oscillation signal with the second sine-wave signal by the mixer to obtain a radar signal. Then, the first antenna device 111 in the antenna module 110 is used to send the radar signal for radar sensing.

Subsequently, the remaining antenna devices in the antenna module 110, such as the second antenna device 112, the third antenna device 113 and the fourth antenna device 114, are used to receive radar input signals reflected by a target object. The frequency downconverters 125, 132 and 133 are then used to receive the radar input signals from the second antenna device 112, the third antenna device 113 and the fourth antenna device 114, and to receive the radar signal from the frequency upconverter 124, to output a plurality of phase difference/frequency difference radar signals. In this embodiment, the frequency downconverters 125, 132 and 133 have mixers that mix the radar signal sent by the electric device 100 with the radar input signals received to obtain a plurality of phase difference/frequency difference radar signals.

Then, the radar signal processing circuit 134 is used to receive these phase difference/frequency difference radar signals to obtain information about an object to be detected (i.e. the target object) in accordance with these phase difference/frequency difference radar signals. In this embodiment, since the electric device 100 uses a plurality of antenna devices to perform a radar sensing operation, the radar signal processing circuit 134 can calculate an angle of arrival (AoA) by using the phase difference/frequency difference radar signals. So that the radar sensing operation performed by the electric device 100 can obtain the distance, speed and angle of the target. In addition, as shown in FIG. 5, when the radar sensing operation is performed, the IF oscillator circuit 121, the modulation circuit 122 and the first demodulation circuit 126 are in a disabled state. However, the embodiments of the present invention are not limited thereto.

In some embodiments, the electric device 100 may further includes a plurality of second demodulation circuits (not shown). For example, the electric device 100 may further include two second demodulation circuits, one is disposed between the frequency downconverter 132 and the radar signal processing circuit 134, and the other is disposed between the frequency downconverter 133 and the radar signal processing circuit 134. When the electric device 100 performs a millimeter wave communication operation, the second demodulation circuit receives an IF oscillation signal of the IF oscillator circuit 121 to demodulate the signals received by the antenna devices 113 and 114. The demodulated signals are directly output, but not input into the radar signal processing circuit 134. In such a way, the electric device 100 can achieve a multi-input multi-output (MIMO) function.

Figure 6:
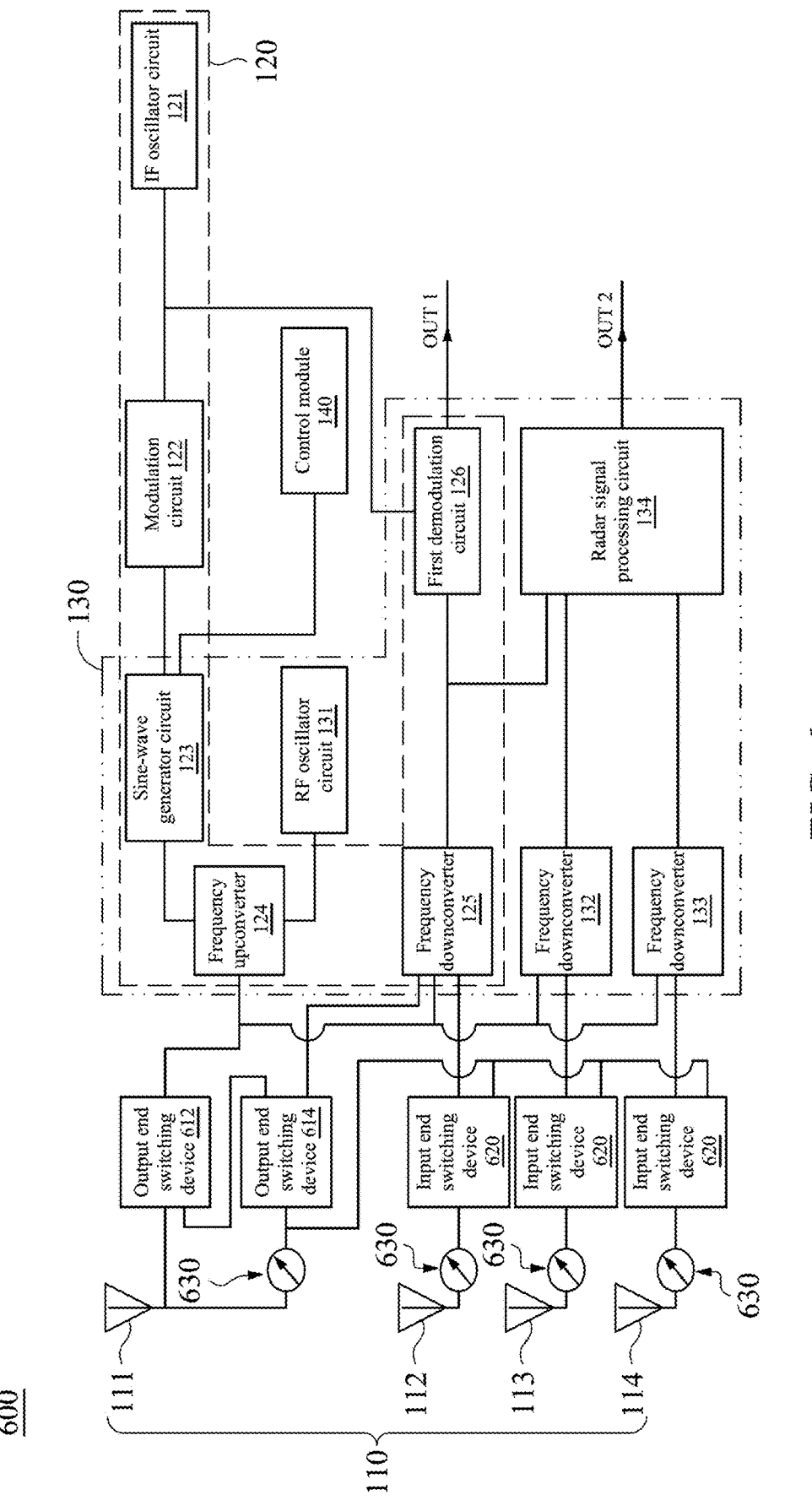
FIG. 6 is a functional block diagram showing the millimeter wave communication and radar sensing device in accordance with embodiments of the present invention.

Referring to FIG. 6, a functional block diagram shows an electric device 600 for utilizing millimeter wave communication and radar sensing in accordance with embodiments of the present invention. The electric device 600 is similar to the electric device 100 above, except that the electric device 600 further includes an output end switching device 612, an output end switching device 614, a plurality of input end switching devices 620 and a plurality of phase control circuits 630.

Figure 7:
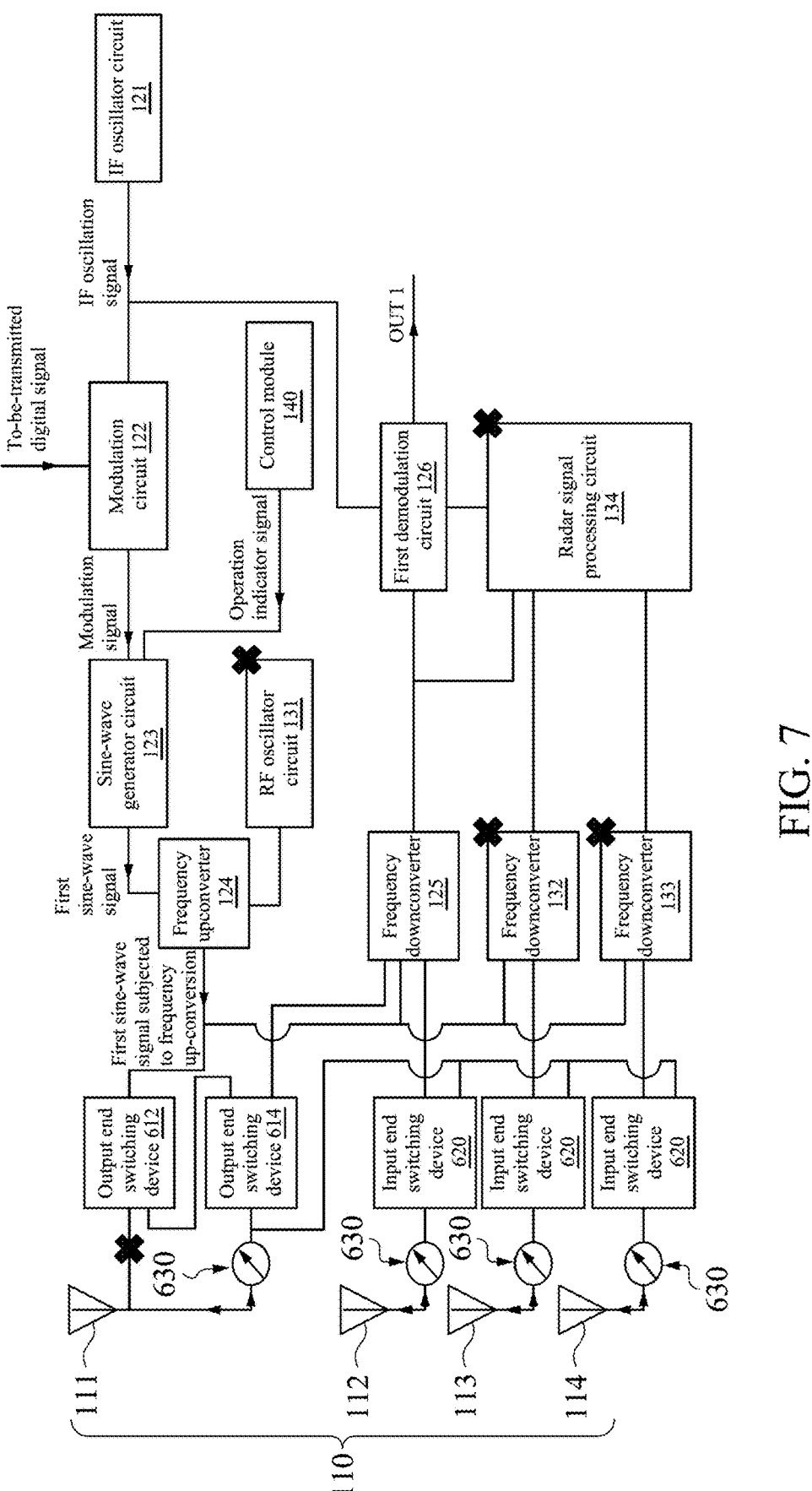
FIG. 7 is a schematic diagram showing performing a millimeter wave communication operation by the millimeter wave communication and radar sensing device in accordance with embodiments of the present invention.
Figure 8:
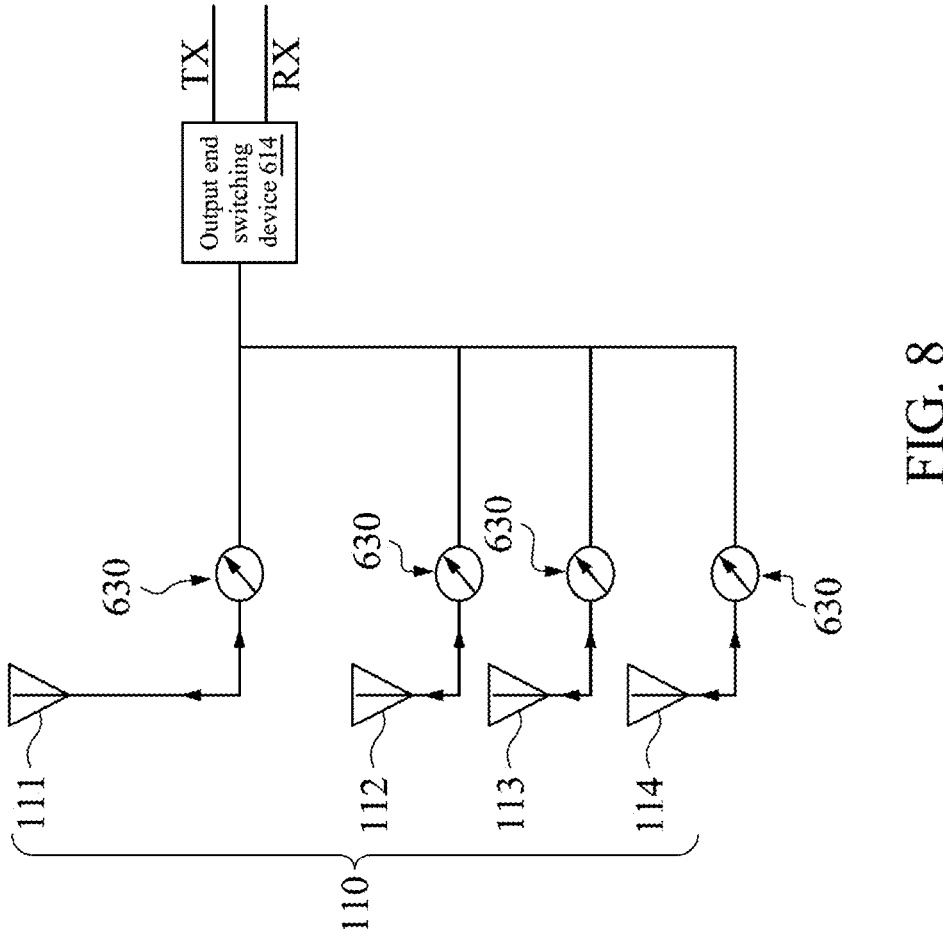
FIG. 8 is a schematic diagram showing an antenna array in accordance with embodiments of the present invention.

Simultaneously referring to FIGS. 6, 7 and 8, as shown in FIG. 6, the millimeter wave communication operation of the electric device 600 is similar to that of the electric device 100, except that the switching between the output end switching devices 612 and 614 and the input end switching devices 620 allows the antenna devices of the antenna module 110 to form an antenna array. For example, when the electric device 600 performs the millimeter wave communication operation, the output end switching device 612 is switched to communicate with the output end switching device 614 but not communicate with the first antenna device 111, and the input end switching devices 620 are switched to communicate with the output end switching device 614 but not communicate with the frequency downconverters 125, 132 and 133. Hence the antenna array shown in FIG. 8 can be obtained. In FIG. 8, the output end switching device 614 is switched between a transmitter TX and a receiver RX to perform signal transmission and reception of the millimeter wave communication operation, wherein the transmitter TX corresponds to a path of the output end switching device 612, and the receiver RX corresponds to a path of the frequency downconverter 125.

Since the electric device 600 is provided with the phase control circuits 630 to change the signal phases of the first antenna device 111, the second antenna device 112, the third antenna device 113 and the fourth antenna device 114, the antenna array shown in FIG. 8 can be regarded as a phase array antenna.

Referring to FIG. 7, when the millimeter wave communication operation is performed, the RF oscillator circuit 131, the frequency downconverter 132, the frequency downconverter 133, and the radar signal processing circuit 134 are disabled, and the frequency downconverter 125 receives signals from the output end switching device 614 and does not receive signals from the frequency upconverter 124.

Figure 9:
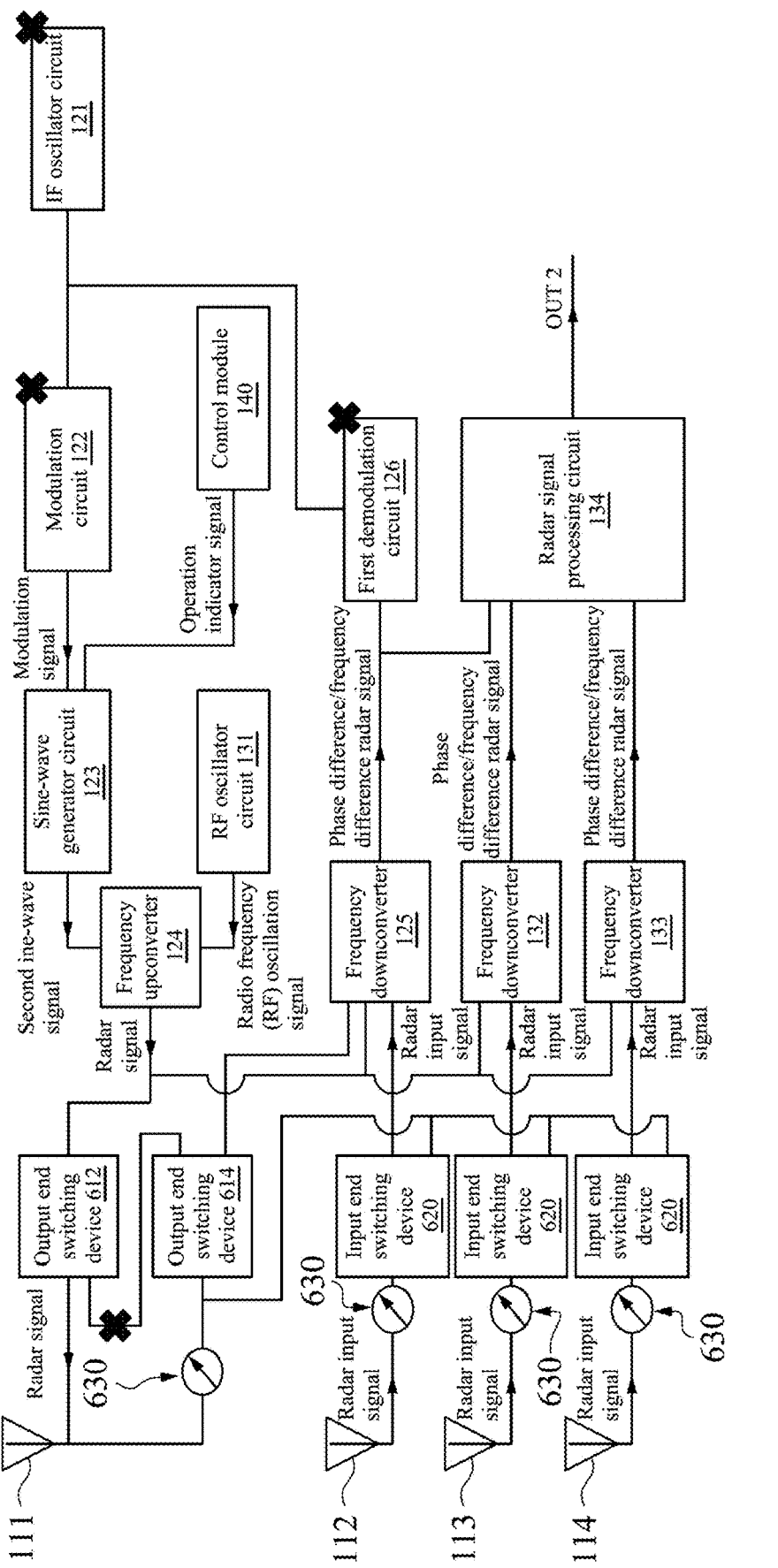
FIG. 9 is a schematic diagram showing a radar sensing operation by the millimeter wave communication and radar sensing device in accordance with embodiments of the present invention.

Referring to FIG. 9, a schematic diagram shows performing a radar sensing operation by the electric device 600 in accordance with embodiments of the present invention. The radar sensing operation of the electric device 600 is similar to that of the electric device 100. When the electric device 600 performs the radar sensing operation, the output end switching device 612 is switched to communicate with the antenna device 111 but not communicate with the output end switching device 614, and the input end switching device 620 is switched to communicate with the frequency downconverters 125, 132, and 133 but not communicate with the output end switching device 614. In addition, in some embodiments, the radar signal processing circuit 134 can perform phase compensation on the radar input signals affected by the phase control circuit 630 to output a radar data signal OUT2. However, the embodiments of the present invention are not limited thereto.

In some embodiments, the electric device 100/600 may be controlled to communicate in a particular communication direction. In other embodiments, the electric device 100/600 may be controlled to scan in advance for a plurality of communication directions, and then communicate in one of these communication directions in accordance with scanning results to obtain a better communication quality.

Figure 10:
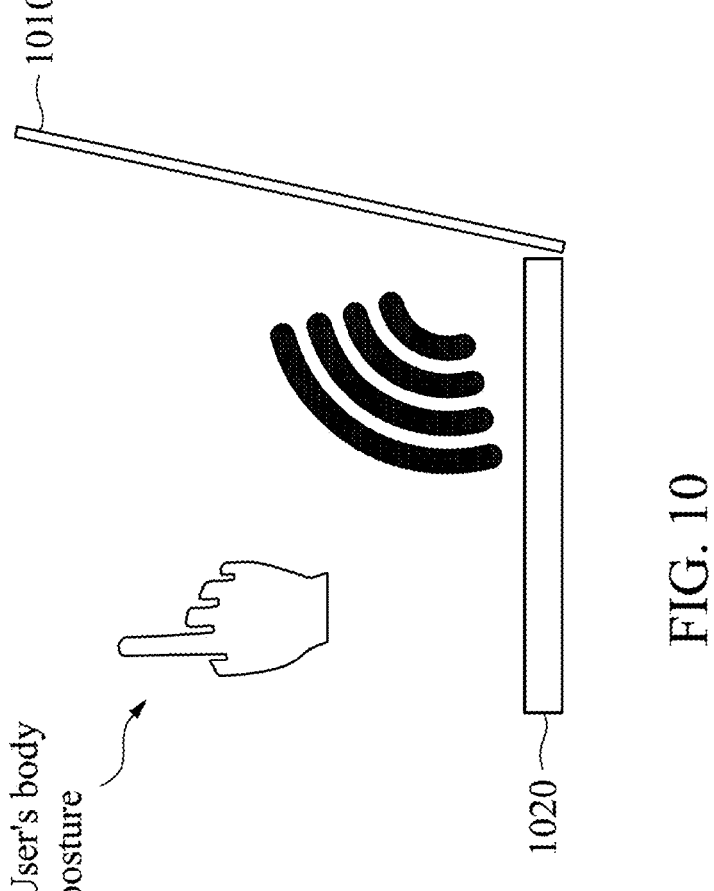
FIG. 10 is an application schematic diagram showing a millimeter wave communication and radar sensing device in accordance with embodiments of the present invention.

Referring to FIG. 10, an application schematic diagram shows the millimeter wave communication and radar sensing device in accordance with embodiments of the present invention. In this embodiment, the electric device 100/600 is applied to a portable computer device. For example, a portable computer including a display module 1010 and a main body 1020 wherein the display module 1010 includes a display screen and a data processing circuit (not shown). The electric device 100/600 is disposed in the display module 1010, but the embodiments of the present invention are not limited thereto. In some embodiments of the present invention, the antenna module 110 of the electric device 100/600 is disposed in the display module 1010, and the remaining circuits of the electric device 100/600 are disposed in the main body 1020.

The data processing circuit of the display module 1010 is electrically connected between the electric device 100/600 and the display screen to receive data output by the electric device 100/600 and display the data on the display module 1010 through the display screen. For example, when the electric device 100/600 performs a millimeter wave communication operation, the electric device 100/600 can receive image data and display on the display module 1010. Yet another example, when the electric device 100/600 performs a radar sensing operation, the electric device 100/600 can detect the user's body posture, and output a detection result to the data processing circuit, so that the data processing circuit performs a corresponding operation in accordance with the detection result, and displays information thereof on the display module 1010. Specifically, the user may make a gesture to adjust the brightness of the screen, so that when the electric device 100/600 adjust the brightness of the screen when sensing the user's gestures, the data processing circuit outputs control instruction to the display module 1010, which causes the display module 1010 to adjust the brightness of the display screen accordingly.

However, embodiments of the present invention are not limited to the brightness adjustment of the display screen. In some embodiments, the electric device 100/600 may sense the user's different hand postures to control the portable computer and outputs corresponding signals to control the portable computer, so that the display module 1010 performs preset operations corresponding to the user's hand postures.

In some embodiments of the present invention, the electric device 100/600 includes a plurality of antenna modules 110 that are disposed separately on edges of the display module to improve the efficiencies of the millimeter wave communication operation and the radar sensing operation of the electric device 100/600.

In some embodiments of the present invention, the electric device 100/600 may be disposed in an autonomous driving system of a vehicle to provide a radar sensing function and a millimeter wave communication function. For example, when the autonomous driving system of the vehicle is required to sense its surroundings, the electric device 100/600 can perform a radar sensing operation to detect objects around the vehicle and transmit results back to the autonomous driving system of the vehicle. Another example, when an user wants to initiate an a telephone communication, the electric device 100/600 can perform a millimeter wave communication operation to provide a communication function to the autonomous driving system of the vehicle, so that the user may carry out telephone communication through the same electric device 100/600 in the autonomous driving system of the vehicle. The electronic 100/600 can switch the radar sensing operation and the millimeter wave communication operation at a high speed, so that the needs for both surrounding sensing and telephone communication can be fulfilled at the same time.

Frequencies for the present invention may vary depending on applications. In some embodiments of the present invention, 60 Ghz (57-71 Ghz), or V-band may be selected for applications on vehicles, because 60 Ghz is unrestricted from industrial regulations and may be applicable to millimeter wave communication and radar simultaneously. In other embodiments of the present invention, 24 GHz and/or 77 GHz may also be utilized together.

Figure 11:
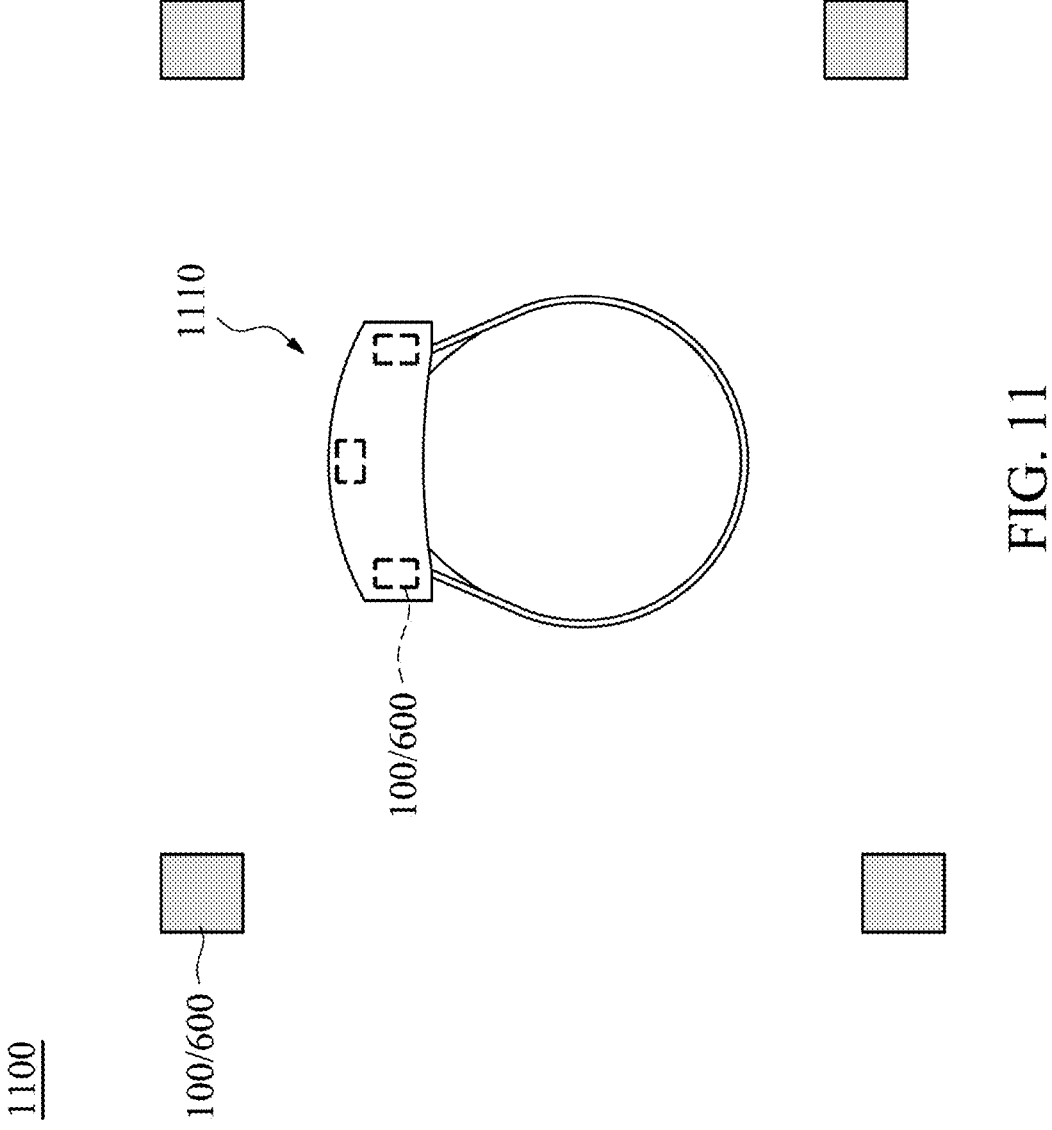
FIG. 11 is an application schematic diagram showing a millimeter wave communication and radar sensing device in accordance with embodiments of the present invention.

Referring to FIG. 11, an application schematic diagram shows an electric device for utilizing millimeter wave communication and radar sensing in accordance with embodiments of the present invention. In this embodiment, the electric device 100/600 is applied to a virtual reality (VR) computer system 1100 which includes a head-mounted display device 1110. The head-mounted display device 1110 is worn by the user and has the electric devices 100/600 on it. These electric devices 100/600 are disposed in different positions of the head-mounted display device 1110 to perform millimeter wave communication and radar sensing functions respectively. Since the electric devices 100/600 have millimeter wave communication and radar sensing functions, the electric devices 100/600 disposed at the head-mounted display device 1110 can supplement each other in functions. For example, when one of the electric devices 100/600 performs the communication function, the other one of the electric devices 100/600 performs the radar sensing function. In such a way, the VR computer system 1100 can use the radar sensing function to sense the user's operation gestures and uses the millimeter wave communication function to transmit relevant data to, for example, external signal senders and receivers.

In some embodiments of the present invention, frequency 77 GHz (76-81 GHZ), or W-band may be selected, because 77 GHz has higher radar resolutions and capable of sensing details in fine movements. Antenna required are also smaller and suitable for wearable equipment. However, other frequencies may be utilized together for variable purposes.

In some embodiments, the VR computer system 1100 may have various operation modes. For example, in a first operation mode, the VR computer system 1100 enables one electric device 100/600 for communication and two electric devices 100/600 for radar sensing. In a second operation mode, the VR computer system 1100 enables two electric devices 100/600 for communication and one electric device 100/600 for radar sensing. Since the electric device 100/600 of the embodiments of the present invention is capable of the radar sensing function and the millimeter wave communication function, the VR computer system 1100 can easily switch between different operation modes.

In some embodiments, the VR computer system 1100 may include more electric devices 100/600 that are disposed in a user environment to sense the user's body movements. Similarly, the VR computer system 1100 can also switch the operation functions of these electric devices 100/600 to meet the needs of users.

Although the present invention has been disclosed in embodiments as above, the embodiments are not intended to limit the present invention. Those of ordinary skill in the art may make some changes and embellishments within the spirit and scope of the present invention, so the scope of protection of the present invention shall be subject to the appended claims.

What is claimed is:

1. A millimeter wave communication and radar sensing device, comprising:

at least one antenna module, comprising a plurality of antenna devices;

a millimeter wave communication module, electrically connected to the at least one antenna module to perform a millimeter wave communication operation by using the at least one antenna module;

a radar sensing module, electrically connected to the at least one antenna module to perform a radar sensing operation by using the at least one antenna module; and a control module, electrically connected to the millimeter wave communication module and the radar sensing module to control the millimeter wave communication module and the radar sensing module by using an operation indicator signal to perform the millimeter wave communication operation and the radar sensing operation in a predetermined work period;

wherein when the control module controls the millimeter wave communication module to perform the millimeter wave communication operation, the millimeter wave communication module is configured to:

provide an intermediate frequency (IF) oscillation signal by using an IF oscillator circuit;

perform a modulation operation on the IF oscillation signal and a to-be-transmitted digital signal to output a modulation signal by using a modulation circuit;

receive the modulation signal and the operation indicator signal by using a sine-wave generator circuit to output a first sine-wave signal in accordance with the operation indicator signal;

perform frequency up-conversion on the first sine-wave signal by using a frequency upconverter, and output the first sine-wave signal frequency up-conversed to the at least one antenna module;

receive at least one communication input signal from the at least one antenna module by using at least one of a plurality of frequency downconverters to perform frequency down-conversion on the at least one communication input signal; and receive the at least one communication input signal from the one of the frequency downconverters and receive the IF oscillation signal from the IF oscillator circuit by using a first demodulation circuit to demodulate the at least one communication input signal in accordance with the IF oscillation signal to obtain a desired signal;

when the control module controls the radar sensing module to perform the radar sensing operation, the radar sensing module is configured to:

receive the operation indicator signal by using the sine-wave generator circuit to output a second sine-wave signal in accordance with the operation indicator signal;

provide a radio frequency (RF) oscillation signal by using a radio frequency (RF) oscillator circuit;

receive the second sine-wave signal and the RF oscillation signal by using the frequency upconverter to output a radar signal to the at least one antenna module;

receive a plurality of radar input signals from the at least one antenna module and receive the radar signal from the frequency upconverter by using a plurality of frequency downconverters to output a plurality of phase difference/frequency difference radar signals; and receive the phase difference/frequency difference radar signals by using a radar signal processing circuit to obtain information about an object to be detected in accordance with the phase difference/frequency difference radar signals.

2. The millimeter wave communication and radar sensing device of claim 1, wherein the antenna devices comprise a first antenna device, a second antenna device, a third antenna device and a fourth antenna device; and the millimeter wave communication and radar sensing device further comprises:

a plurality of output end switching devices, electrically connected in series between the first demodulation circuit and the first antenna device in the antenna devices;

a plurality of input end switching devices, electrically connected to the first antenna device, the second antenna device, the third antenna device and the fourth antenna device in a one-to-one correspondence mode; and a plurality of phase control circuits, electrically connected to the antenna devices in a one-to-one correspondence mode;

wherein when the control module controls the millimeter wave communication module to perform the millimeter wave communication operation, the control module is configured to control the output end switching devices, the input end switching devices and the phase control circuits so that the first antenna device, the second antenna device, the third antenna device and the fourth antenna device form an antenna array, and further configured to control the antenna array to communicate in a communication direction.

3. The millimeter wave communication and radar sensing device of claim 2, wherein when the control module controls the millimeter wave communication module to perform the millimeter wave communication operation, the control module is further configured to control the antenna array to scan in a plurality of communication directions to communicate in one of the communication directions.

4. The millimeter wave communication and radar sensing device of claim 1, wherein the operation indicator signal is predetermined in the control module, and comprises a plurality of operating periods; each of the operating periods is the same as the predetermined work period, and comprises a communication operating sub-period and a radar operating sub-period; the communication operating sub-period is configured to indicate the millimeter wave communication module to perform the millimeter wave communication operation; and the radar operating sub-period is configured to indicate the radar sensing module to perform the radar sensing operation.

5. The millimeter wave communication and radar sensing device of claim 1, wherein the control module is further configured to select one of a radar operation signal and a communication operation signal as the operation indicator signal in accordance with a user setting, wherein the radar operation signal is configured to indicate the radar sensing module to perform the radar sensing operation, and the communication operation signal is configured to indicate the millimeter wave communication module to perform the millimeter wave communication operation.

6. The millimeter wave communication and radar sensing device of claim 1, wherein all of the frequency downconverters receive a plurality of communication input signals from the at least one antenna module, and when all of the frequency downconverters receive the communication input signals from the at least one antenna module to perform frequency down-conversion on the communication input signals, the millimeter wave communication module is configured to:

receive the communication input signals from the frequency downconverters and receive the IF oscillation signal from the IF oscillator circuit by using the first demodulation circuit and a plurality of second demodulation circuits to demodulate the communication input signals in accordance with the IF oscillation signal to obtain a desired signal.

7. A millimeter wave communication and radar sensing method, comprising:

control a millimeter wave communication module and a radar sensing module to perform a millimeter wave communication operation and a radar sensing operation in a predetermined work period;

wherein the millimeter wave communication operation comprises:

providing an intermediate frequency (IF) oscillation signal by using an IF oscillator circuit;

performing a modulation operation on the IF oscillation signal and a to-be-transmitted digital signal by using a modulation circuit to output a modulation signal;

receiving the modulation signal and an operation indicator signal by using a sine-wave generator circuit to output a first sine-wave signal in accordance with the operation indicator signal and the modulation signal;

performing frequency up-conversion on the first sine-wave signal by using a frequency upconverter, and outputting the first sine-wave signal frequency up-conversed to at least one antenna module;

receiving at least one communication input signal from the at least one antenna module by using at least one of a plurality of frequency downconverters to perform frequency down-conversion on the at least one communication input signal; and receiving the at least one communication input signal from the one of the frequency downconverters and receive the IF oscillation signal from the IF oscillator circuit by using a first demodulation circuit to demodulate the at least one communication input signal in accordance with the IF oscillation signal to obtain a desired signal;

the radar sensing operation comprises:

receiving the operation indicator signal by using the sine-wave generator circuit to output a second sine-wave signal in accordance with the operation indicator signal;

providing a radio frequency (RF) oscillation signal by using a radio frequency (RF) oscillator circuit;

receiving the second sine-wave signal and the RF oscillation signal by using the frequency upconverter to output a radar signal to the at least one antenna module;

receiving a plurality of radar input signals from the at least one antenna module and receiving the radar signal from the frequency upconverter by using a plurality of frequency downconverters to output a plurality of phase difference/frequency difference radar signals; and receiving the phase difference/frequency difference radar signals by using a radar signal processing circuit to obtain information about an object to be detected in accordance with the phase difference/frequency difference radar signals.

8. The millimeter wave communication and radar sensing method of claim 7, wherein the at least one antenna module comprises a plurality of antenna devices, the antenna devices comprise a first antenna device, a second antenna device, a third antenna device and a fourth antenna device; and the method for utilizing millimeter wave communication and radar sensing further comprises:

providing a plurality of output end switching devices, wherein the output end switching devices are electrically connected in series between the first demodulation circuit and the first antenna device in the antenna devices;

providing a plurality of input end switching devices, wherein the input end switching devices are electrically connected to the first antenna device, the second antenna device, the third antenna device and the fourth antenna device in a one-to-one correspondence mode; and providing a plurality of phase control circuits, wherein the phase control circuits are electrically connected to the antenna devices in a one-to-one correspondence mode;

wherein the millimeter wave communication operation further comprises: controlling the output end switching devices, the input end switching devices and the phase control circuits so that the first antenna device, the second antenna device, the third antenna device and the fourth antenna device form an antenna array, and controlling the antenna array to communicate in a communication direction.

9. The millimeter wave communication and radar sensing method of claim 8, wherein the millimeter wave communication operation further comprises: controlling the antenna array to perform scanning operations towards plural communication directions to allow communication towards one of the communication directions.

10. The millimeter wave communication and radar sensing method of claim 7, wherein the operation indicator signal is predetermined in a control module, and comprises a plurality of operating periods; each of the operating periods is the same as the predetermined work period, and comprises a communication operating sub-period and a radar operating sub-period; the communication operating sub-period is configured to indicate the millimeter wave communication module to perform the millimeter wave communication operation; and the radar operating sub-period is configured to indicate the radar sensing module to perform the radar sensing operation.

* * * * *